(12) United States Patent
Ansari

(10) Patent No.: US 12,203,681 B2
(45) Date of Patent: Jan. 21, 2025

(54) GARAGE DOOR VENTILATION SYSTEMS

(71) Applicant: Michael M. Ansari, Oak Park, CA (US)

(72) Inventor: Michael M. Ansari, Oak Park, CA (US)

( * ) Notice: Subject to any disclaimer, the term of this patent is extended or adjusted under 35 U.S.C. 154(b) by 0 days.

(21) Appl. No.: 18/450,711

(22) Filed: Aug. 16, 2023

(65) Prior Publication Data

US 2024/0060664 A1 Feb. 22, 2024

Related U.S. Application Data

(60) Provisional application No. 63/371,587, filed on Aug. 16, 2022.

(51) Int. Cl.
| | | |
|---|---|---|
| *B01D 53/22* | (2006.01) | |
| *B01D 46/00* | (2022.01) | |
| *B01D 46/10* | (2006.01) | |
| *F24F 7/003* | (2021.01) | |
| *F24F 7/013* | (2006.01) | |
| *F24F 8/108* | (2021.01) | |

(52) U.S. Cl.
CPC .......... *F24F 7/013* (2013.01); *B01D 46/0005* (2013.01); *B01D 46/10* (2013.01); *F24F 7/003* (2021.01); *F24F 8/108* (2021.01)

(58) Field of Classification Search
CPC .... F24F 7/003; F24F 7/013; F24F 8/10; F24F 8/108; E06B 3/48; E06B 7/02; E06B 9/02
USPC ......... 55/385.1, DIG. 31; 160/113, 116–118, 160/97, 201
See application file for complete search history.

(56) References Cited

U.S. PATENT DOCUMENTS

| | | | | |
|---|---|---|---|---|
| 1,439,580 A | * | 12/1922 | Schwartz | ................ B41F 13/54 |
| | | | | 270/47 |
| 4,378,043 A | * | 3/1983 | Sorenson | .................. E06B 7/03 |
| | | | | 160/97 |
| 4,653,566 A | | 3/1987 | Miale | |
| 5,611,382 A | * | 3/1997 | Sferra | ....................... E06B 9/52 |
| | | | | 160/113 |
| 5,764,850 A | * | 6/1998 | Olstad | ..................... F23D 14/66 |
| | | | | 219/544 |
| 5,860,465 A | | 1/1999 | Eastridge et al. | |
| 5,904,199 A | | 5/1999 | Messner | |

(Continued)

*Primary Examiner* — Anthony R Shumate
(74) *Attorney, Agent, or Firm* — Dunlap Bennett & Ludwig, PLLC

(57) ABSTRACT

A ventilation element attachable to a lower portion of a sectional garage door for enabling a ventilation condition of the garage door in a partially open position. The ventilation element provides a peripheral frame dimensioned and shaped to mimic a lower section of the sectional garage door. The peripheral frame enables a plurality of filters to be removably nested therein. The peripheral frame is movably attached to the interior surface of the garage door by a plurality of travel bars fixed thereto; a complementary number of grip brackets are attached to the peripheral frame so that the peripheral frame is moveable between a retracted position and an extended position disposing the peripheral frame below a bottom elevation of the garage door so that when the garage door is in the partially open position, the peripheral frame and nested filters established a ventilation barrier between the garage door and the driveway.

8 Claims, 5 Drawing Sheets

(56) References Cited

U.S. PATENT DOCUMENTS

| | | | | |
|---|---|---|---|---|
| 6,092,580 | A * | 7/2000 | Lucas | E06B 3/485 |
| | | | | 160/113 |
| 6,386,969 | B1 | 5/2002 | O'Brien | |
| 6,557,614 | B1 | 5/2003 | Lampers | |
| 6,766,623 | B1 * | 7/2004 | Kalnay | E04B 1/3441 |
| | | | | 135/147 |
| 7,143,803 | B2 * | 12/2006 | Mitchell | E06B 7/02 |
| | | | | 160/113 |
| 8,460,419 | B1 * | 6/2013 | Hobbs | B01D 46/2411 |
| | | | | 55/DIG. 35 |
| 9,512,668 | B1 | 12/2016 | Nissan | |
| 9,719,290 | B1 * | 8/2017 | Arroyo | E06B 3/485 |
| 9,957,753 | B2 * | 5/2018 | Amsellem | E06B 9/52 |
| 10,604,994 | B2 | 3/2020 | Logsdon, Sr. | |
| 10,940,417 | B1 * | 3/2021 | Bishop | B01D 46/0006 |
| 11,608,674 | B2 * | 3/2023 | Fazio | E05D 3/02 |
| 2005/0072074 | A1 | 4/2005 | Moore | |
| 2009/0084507 | A1 | 4/2009 | Tescher | |
| 2017/0308654 | A1 * | 10/2017 | Luz Rello-Sanchez | |
| | | | | G06N 20/10 |
| 2019/0257138 | A1 | 8/2019 | Vitello | |

\* cited by examiner

GARAGE DOOR VENTILATION SYSTEMS

CROSS-REFERENCE TO RELATED APPLICATION

This application claims the benefit of priority of U.S. provisional application No. 63/371,587, filed 16 Aug. 2022, the contents of which are herein incorporated by reference.

BACKGROUND OF THE INVENTION

The present invention relates to garage doors and, more particularly, a garage door ventilation system and a method of improving garage doors.

To increase ventilation into a garage, homeowners typically leave the garage door partially open so that there is a gap between the bottom of the garage door and the driveway, thereby enabling airflow into the garage from the exterior environment. Though this may provide natural air circulation within the garage, the downside is that it allows debris from passing cars and lawncare devices, such as mowers and leaf blowers, to enter the garage space. This gap also allows for incursion from vermin and can even entice human intruders. Furthermore, neighbors may complain about the unappealing aesthetic of a partially open garage door.

As can be seen, there is a need for a ventilation system for garage doors that enables air flow while also maintaining a barrier between the bottom of the garage door and the driveway.

SUMMARY OF THE INVENTION

The present invention may embody a filter panel that in certain embodiments, replaces a bottom panel of a sectional garage door of other types of garage doors. In other embodiments, the present invention provides a filter panel movably attached to a bottom interior of the garage door so as to move between a retracted position tucked behind said bottom portion and an extended position effectively extending the bottom of the garage door so that when the pre-existing garage door is partially open, the extended filter panel occupies the gap or void between the bottom of the garage door and the driveway.

The present invention prevents stuffy air in the garage, provides natural air circulation without the use of a fan, thereby improving indoor garage air quality, and enhancing the aesthetic of a partially open garage door by filling the gap with the filter panel that mimics the bottom section of the garage door.

The present invention prevents animals or vermin from sneaking into the garage when the garage door is partially open and prevents dust and debris of passing cars or nearby yard work from infiltrating the garage space. Accordingly, the present invention keeps the garage indoor air clean, ventilates gas accumulation and improves the garage air quality without use of fan, as well as prevents entry from outside intruders, while providing a better aesthetic for the garage door.

The present invention includes a ventilation element that embodies the filter panel, wherein the ventilation element can be added as an accessory section enabling a new function to the garage. The ventilation element and its filter panel may become a fixed part of the garage door that in its retracted position is unseeable by those outside the garage. The ventilation element may be fixed to an interior surface of a pre-existing garage so as to be movable up or down depending on the position of the garage door, thereby enabling the pre-existing garage door to be positioned in a fully closed position, fully opened position and a partially opened position whereby the ventilation element extends from the bottom of the garage door to the driveway, enabling the ventilation condition disclosed herein.

In one aspect of the present invention, a ventilation system for a garage door includes the following: a frame for removably nesting filters; a plurality of grip brackets connected to the frame; and a plurality of travel bars directly fixed to a lowest section of the garage door, wherein the pluralities of grip brackets and travel bars are configured so that the frame is movable between a retracted position and an extended position projecting beyond the lowest section of the garage door, whereby with the garage door in a partially open position, the frame closes a gap between the lowest section of the garage door and a floor of the garage of the garage door.

In another aspect of the present invention, the ventilation system for a garage door further includes the following: a lattice structure extending between a periphery of the frame, wherein the lattice structure provides a plurality of openings having a surface area less than one inch; one or more longitudinal slots provided by a periphery of the frame; and one or more filters dimensioned and shaped to move through the one or more longitudinal slots between a nested condition and an unnested condition; two grip brackets per travel bar, wherein the two grip brackets are spaced apart between four and six inches; a plurality of bracket plates directly connected to the frame for connecting the plurality of grip brackets thereto, wherein each grip bracket comprises grip flanges for operatively associating with an outer circumference of one of the plurality of travel bars, wherein the plurality of travel bars is connected to an interior surface of the lowest section of the garage door, wherein the frame in the retracted position is not visible from a driveway of the garage.

In yet another aspect of the present invention, a method of improving a sectional garage door includes operatively associating the above-mentioned ventilation system to a lowest section of the sectional garage door, wherein said ventilation system is dimensioned and shaped to mimic lowest section of the sectional garage door.

These and other features, aspects and advantages of the present invention will become better understood with reference to the following drawings, description, and claims.

Figure 7:
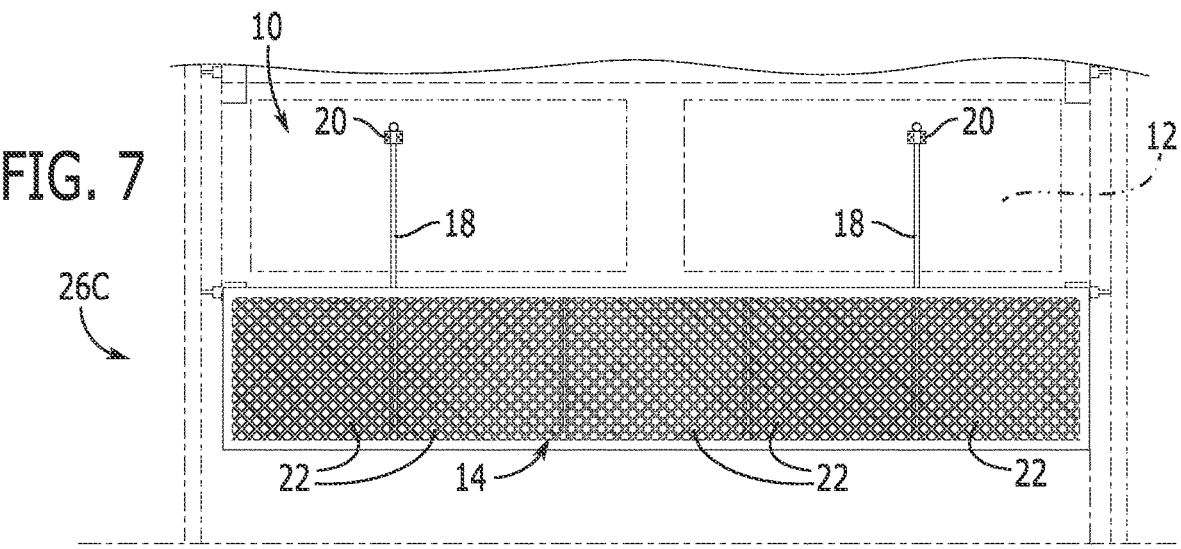

FIG. 7 is an elevation view of an exemplary embodiment of the present invention, showing the ventilation element 10 in the extended position with the garage door 12 further open than the ventilation condition, defining an enhanced ventilation condition 26C.

Figure 8:
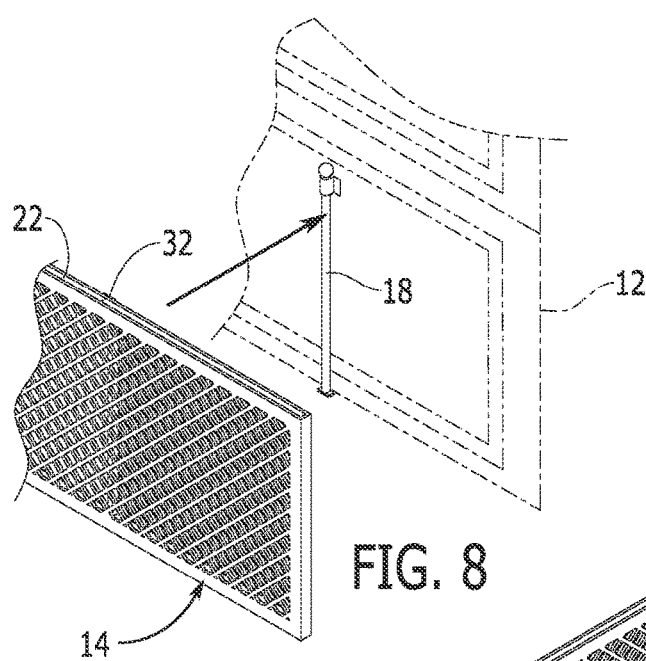

FIG. 8 is a front detail exploded view of an exemplary embodiment of the present invention (the view is shown from an interior of the garage), illustrating the connection between the garage door 12 and the ventilation element 10.

Figure 9:
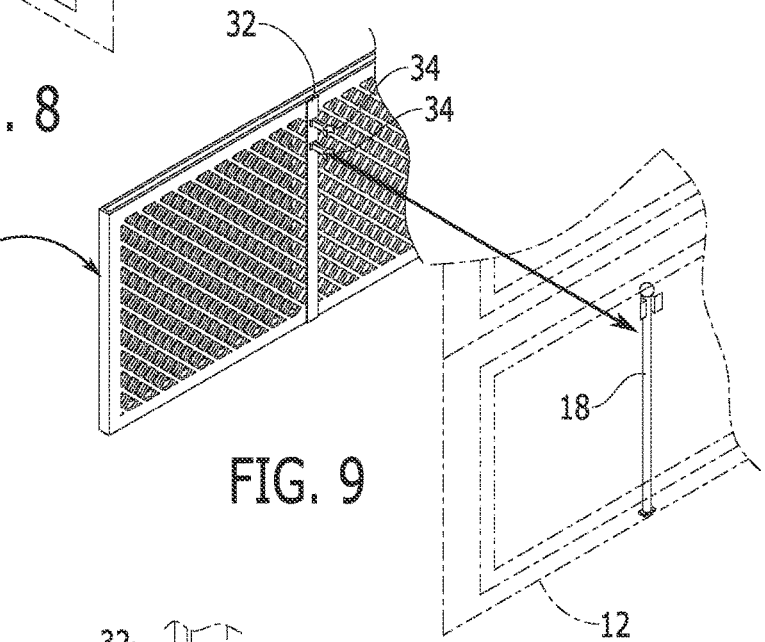

FIG. 9 is a rear detail exploded view of an exemplary embodiment of the present invention, illustrating the connection between the garage door 12 and the ventilation element 10.

Figure 10:
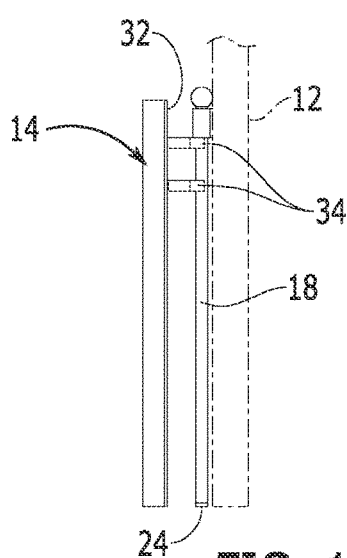

FIG. 10 is a detailed side view of an exemplary embodiment of the present invention, illustrating the connection between the garage door 12 and the ventilation element 10 by way of a travel bar 18 fixed to the garage door 12 and grip brackets 34 fixed to the ventilation element 10.

Figure 11:
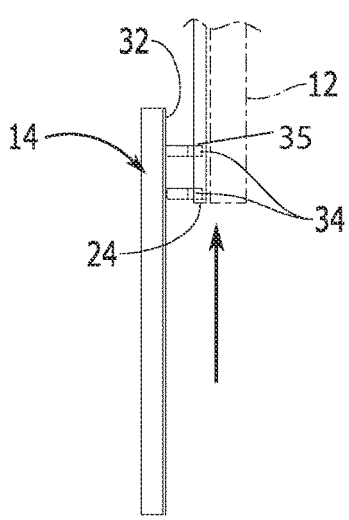

FIG. 11 is a detailed side view of an exemplary embodiment of the present invention, illustrating how the ventilation element 10 may move independently of the garage door 12 between the retracted position of FIG. 10 and the extended position of FIG. 11.

Figure 12:
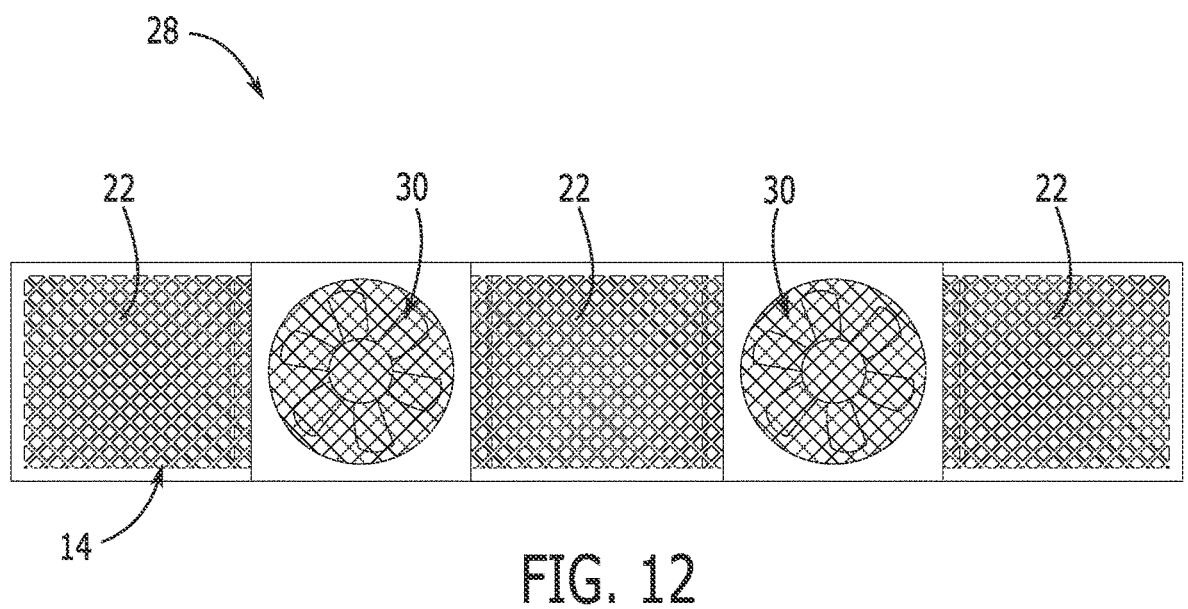

FIG. 12 is an elevation view of an exemplary embodiment of an alternative ventilation element 28 of the present invention with fans 30 within the ventilation peripheral frame 14 of the ventilation element 28.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, the present invention is a ventilation system embodying a ventilation element attachable to a lower portion of a sectional garage door for enabling a ventilation condition of the garage door in a partially open position. The ventilation element provides a peripheral frame dimensioned and shaped to mimic a lower section of the sectional garage door. The peripheral frame enables a plurality of filters to be removably nested therein. The peripheral frame is movably attached to the interior surface of the garage door by a plurality of travel bars fixed thereto; a complementary number of grip brackets are attached to the peripheral frame so that the peripheral frame is moveable between a retracted position and an extended position disposing the peripheral frame below a bottom elevation of the garage door so that when the garage door is in the partially open position, the peripheral frame and nested filters established a ventilation barrier between the garage door and the driveway.

Referring now to FIGS. 1 through 12, the present invention may include a ventilation element 10 that is dimensioned and adapted to be movably attached to a sectional garage door 12, thereby improving air quality within a garage interior 11A without leaving a gap between the bottom of the garage door 12 and the driveway 11B. Sectional garage doors are usually constructed of three to eight panels and slide up and overhead. The ventilation element 10 width can vary in size and can be between 12 to 14 inches in height or greater if need be for the ventilation element 10 to mimic a bottom section of the sectional garage door 12 it is operatively associated therewith. The ventilation element 10 may be made of aluminum, melamine, durable plastic, or any other material sufficient to handle the functionality disclosed herein.

The ventilation element 10 may include a peripheral frame 14 that defines one or more filter slots 22A through which a plurality of filters 22 may be removably mounted. The peripheral frame 14 may be rectangular and be dimensioned and shaped to occupy a lower section of a sectional garage door 12. It being understood, though, that a wide variety of shapes and ranges of dimensions are contemplated for the peripheral frame 14.

Figure 1:
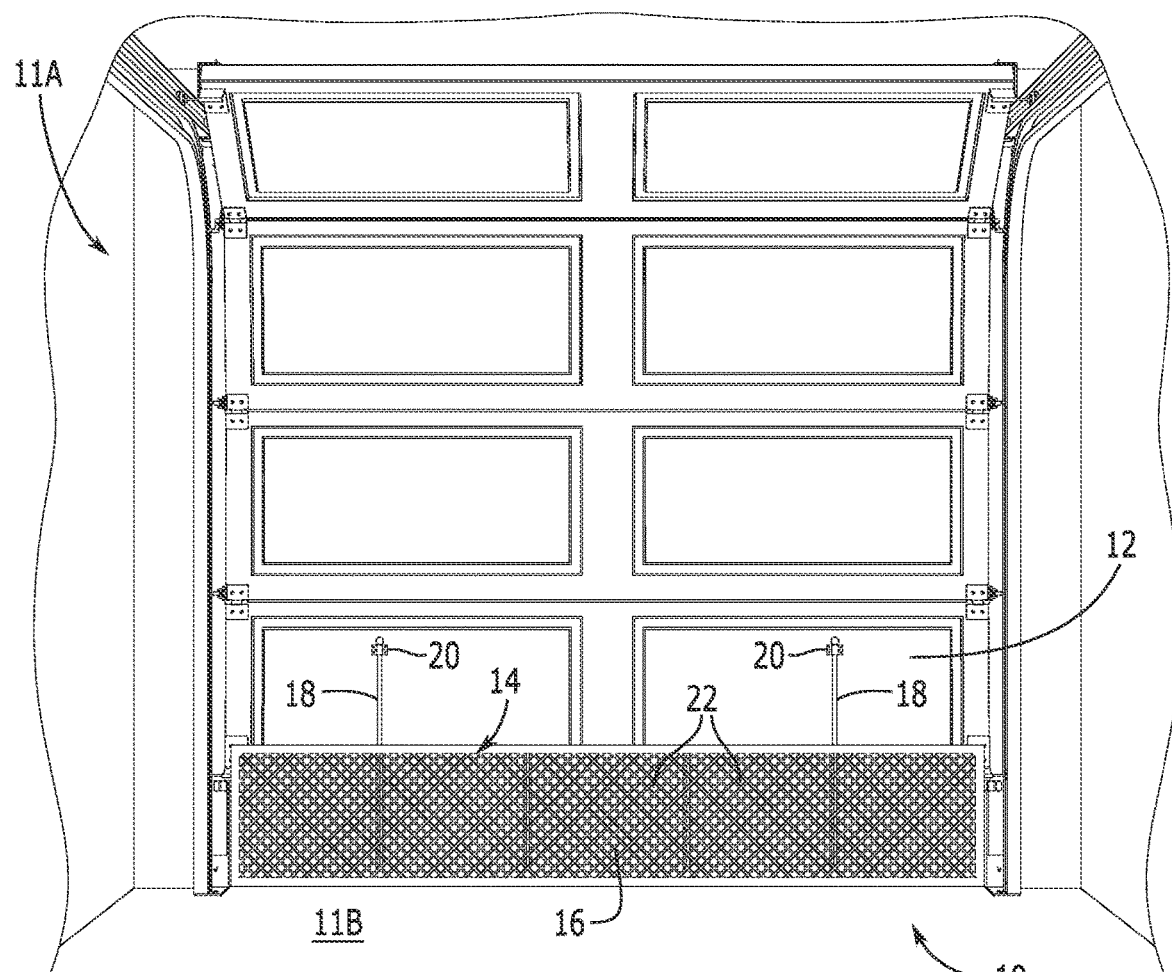
FIG. 1 is an interior elevation view of an exemplary embodiment of the present invention, shown in use in a ventilation condition.
Figure 2:
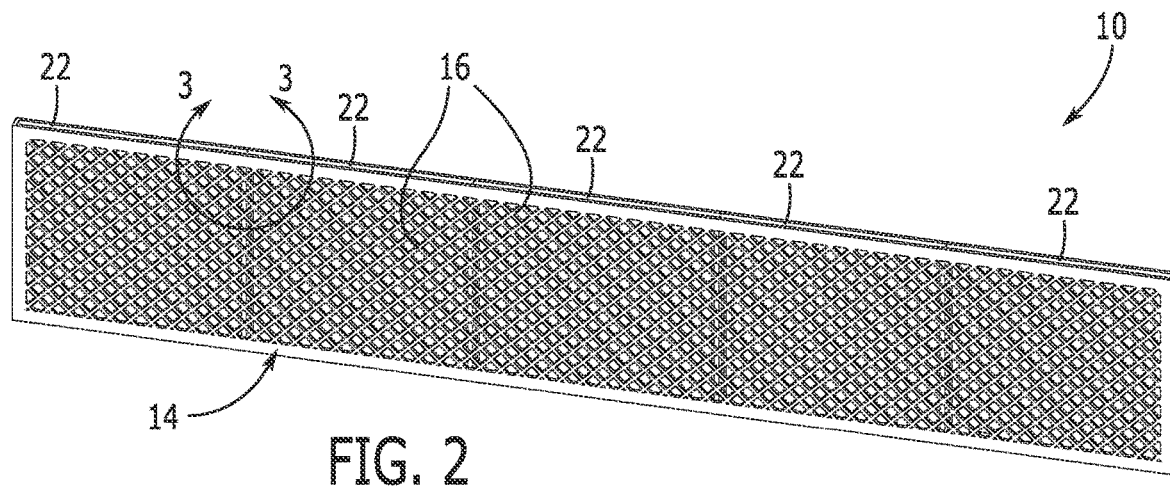
FIG. 2 is a perspective view of an exemplary embodiment of a ventilation element 10 of the present invention.
Figure 3:
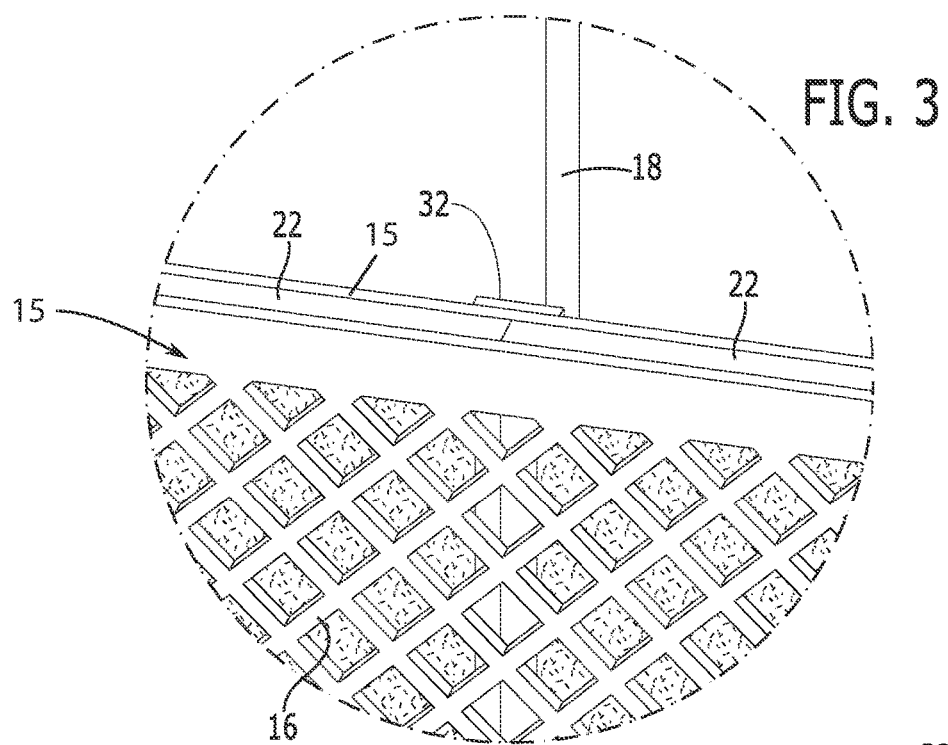
FIG. 3 is a detailed perspective view of an exemplary embodiment of the ventilation element 10 of the present invention, taken along line 3-3 in FIG. 2, illustrating a removable filter 22 in a nested condition occupying an interior void of a peripheral frame 14.
Figure 4:
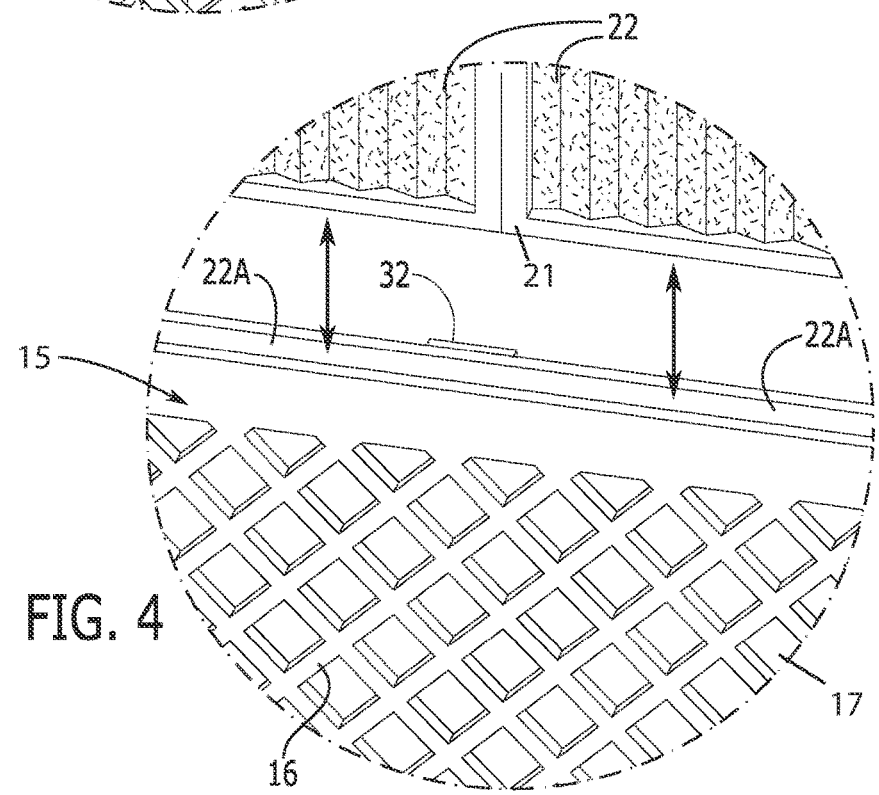
FIG. 4 is a detailed perspective view like FIG. 3 but illustrating the removable filter 22 in an unnested condition, removed from the interior void of the peripheral frame 14.

Referring to FIGS. 3 and 4, the peripheral frame 14 may be two frames 15 having a spaced apart relationship so that an interior space between the two frames 15 is provided, wherein the plurality of filters 22 can be removably nested through a plurality of peripheral slots 22A, respectively, at the edges of the frames 15 that communicates said interior space with an external environment. The plurality of peripheral slots 22A may be along a longitudinal edge of the peripheral frame 14.

A lattice structure 16 may extend between the inner periphery of each frame 15, thereby forming a plurality of openings 17 that communicate with the interior space. It is understood that the lattice structure 16 may be in various designs and shapes. Each opening 17 may have a surface area dimensioned to prevent passage of vermin; for instance, the surface area of each opening 17 may be less than one inch squared.

The plurality of removable filters 22 may be formed in a unitary elongate filter panel 21, wherein the plurality of peripheral slots 22A can be viewed or conceptualized as a unitary peripheral slot 22A that the unitary elongate filter panel 21 moves between a nested condition within the interior space of the peripheral frame 14 and an unnested condition outside of said interior space.

The peripheral frame 14 may be connected by way of grip brackets 34 to travel bars 18 fixed to an interior surface of the garage door 12 by way of connectors 20. Thereby, the peripheral frame 14 (and any nested filters 22) may be slidably connected to the fixed travel bars 18 so as move between a retracted position (FIG. 10) and an extended position (FIG. 11). The slidable movement is relative to the travel bar 18 which maintains a fixed position relative to the garage door 12, as illustrated in FIGS. 10 and 11. Thus, with the garage door 12 in a partially opened position, the peripheral frame 14 may be moved from the retracted position to the extended position, thereby defining a ventilation condition 26B. Alternatively, with the peripheral frame 14 in the retracted position, out of the way, the garage door 12 may be moved to a fully closed position, engaging driveway 11B, defining a stowed condition 26A, wherein the present invention is not visible to those outside the interior of the garage 11A. Each travel bar may terminate with a foot 24, whereby with the garage door in a partially open position, the frame closes a gap between the lowest section of the garage door and a floor of the garage of the garage door, and wherein the garage door is in a fully closed position, each foot 24 engages the floor of the garage.

The grip brackets 34 may be connected to the peripheral frame 14 by way of a bracket plate 32. The grip brackets 34 and the bracket plate 32 critically maintain an approximate one inch to one-and-a-half-inch space between the travel bar 18 and the peripheral frame 14. The grip brackets 34 may have pliable gripping flanges 35 configured to provide a sturdy hold along a circumference of the travel bar 18.

Importantly, the distance between the two grip brackets 34 must be between four to six inches so that the peripheral frame 14 is sturdily held when in either the retracted position or the extended position.

Figure 5:
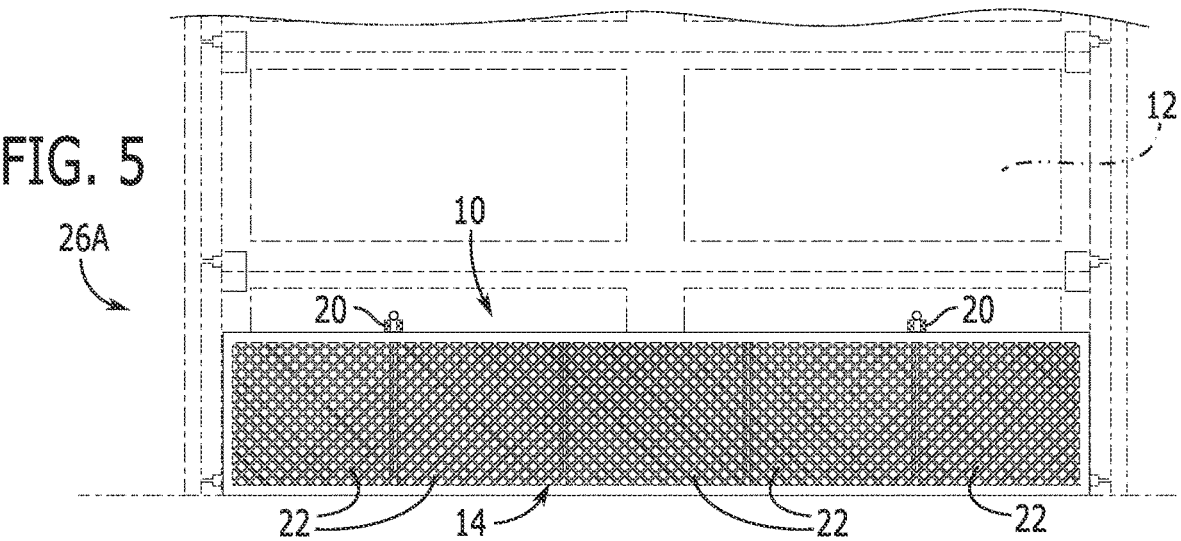
FIG. 5 is an elevation view of an exemplary embodiment of the present invention, showing the ventilation element 10 in a retracted position with the garage door 12 closed, defining a stowed condition 26A.
Figure 6:
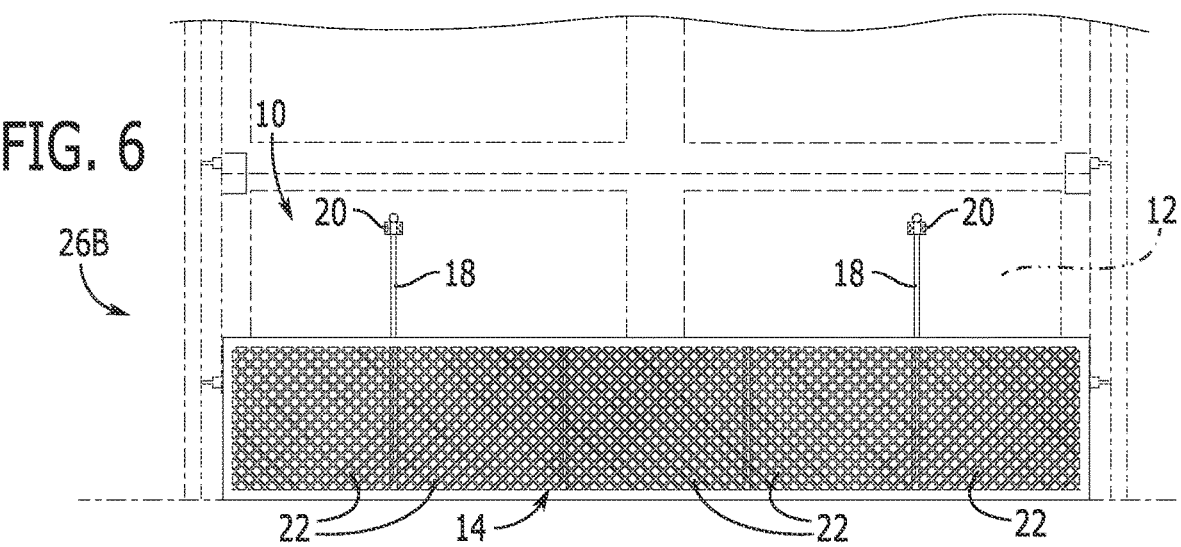
FIG. 6 is an elevation view of an exemplary embodiment of the present invention, showing the ventilation element 10 in an extended position with the garage door 12 partially open, defining the ventilation condition 26B.

Referring to FIGS. 5 through 7, in use an operator can move, by way of manually adjusting the grip brackets 34 so that the peripheral frame 14 moves relative to the travel bar 18 to the retracted position (with the filters 14 in the nested condition), so that the garage door 12 may be fully closed, defining a stowed condition 26A shown in FIG. 5. Then the operator can selectively move the garage door 12 to a partially opened position and the ventilation element 10 to the extended position so that a bottom elevation of the peripheral frame 14 engages the driveway 11B, thereby defining a ventilation condition 26B, with or without the filters 22 occupying the peripheral frame 14 (as the lattice structure 16 by itself can prevent incursion of vermin; though, the nested filters 22 filter debris from entering the garage space), as shown in FIG. 6. The operator can also further elevate the garage door 12 so that the ventilation element 10 is above the driveway 11B in an enhanced ventilation condition 26C, as shown in FIG. 7, affording even more airflow.

Referring to FIG. 12, the present invention contemplates a fan embodiment 28 which includes one or more fans 30 disposed along the ventilation element.

The ventilation element 10 disclosed above may be provided and added to the bottom of the garage door 12. The present invention is useful and practical for standard garage doors 12 used for residential properties, any size, such as one car door, two car or three cars. It solves the problem of indoor stuffy air without any rodents, rats, snakes, and lizards sneaking in. Also, it blocks outside dust and dirt from coming into the garage.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A ventilation system for a garage door, the ventilation system comprising:
   a frame, wherein the frame comprises:
      a first side frame and a second side frame spaced apart so as to define an interior space therebetween; and
      one or more longitudinal slots provided by a periphery of the frame so that each longitudinal slot communicates with said interior space; and
      one or more filters movable between a nested condition and an unnested condition removed from the frame;
   a plurality of grip brackets connected to the frame; and
   a plurality of travel bars directly fixed to a lowest section of the garage door, wherein the pluralities of grip brackets and travel bars are configured so that the frame is movable in a vertical direction between a retracted position and an extended position projecting beyond the lowest section of the garage door,
   wherein each travel bar terminates with a foot,
   whereby with the garage door in a partially open position, the frame closes a gap between the lowest section of the garage door and a floor of the garage of the garage door, and wherein the garage door is in a fully closed position, each foot engages the floor of the garage.

2. The ventilation system of claim 1, further comprising a lattice structure extending between a periphery of the first and second side frames, wherein the lattice structure provides a plurality of openings having a surface area less than one inch, whereby in the unnested condition of the one or more filters, the lattice structure allows larger sized particles and greater air flow than the nested condition.

3. The ventilation system of claim 1, further comprising two grip brackets per travel bar, wherein the two grip brackets are spaced apart between four and six inches.

4. The ventilation system of claim 1, further comprising a plurality of bracket plates directly connected to the frame for connecting the plurality of grip brackets thereto.

5. The ventilation system of claim 1, wherein each grip bracket comprises grip flanges for operatively associating with an outer circumference of one of the plurality of travel bars so that the frame is removable in a horizontal direction orthogonal to the vertical direction.

6. The ventilation system of claim 1, wherein the plurality of travel bars is connected to an interior surface of the lowest section of the garage door.

7. The ventilation system of claim 1, wherein the frame in the retracted position is not visible from a driveway of the garage.

8. A method of improving a sectional garage door, the method comprising operatively associating a ventilation system of claim 1, to a lowest section of the sectional garage door, wherein said ventilation system is dimensioned and shaped to mimic lowest section of the sectional garage door.

\* \* \* \* \*